United States Patent
Rajamani et al.

(10) Patent No.: US 6,694,742 B2
(45) Date of Patent: Feb. 24, 2004

(54) GAS TURBINE SYSTEM OPERATION BASED ON ESTIMATED STRESS

(75) Inventors: Ravi Rajamani, West Hartford, CT (US); David Allen Flodman, Rowley, MA (US); Robert Scott Garry, Delmar, NY (US); Bruce Gordon Norman, Charlton, NY (US); Leroy Tomlinson, Schenectady, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/179,277

(22) Filed: Jun. 26, 2002

(65) Prior Publication Data

US 2004/0000144 A1 Jan. 1, 2004

(51) Int. Cl.$^7$ ................................................. F02C 1/00
(52) U.S. Cl. ....................................... 60/772; 60/39.281
(58) Field of Search ................ 60/773, 772, 39.24, 60/39.25, 39.26, 39.27, 39.281, 39.282, 39.3, 794, 795

(56) References Cited

U.S. PATENT DOCUMENTS

| | | | |
|---|---|---|---|
| 3,832,893 A | * 9/1974 | Dlugos et al. ................ 73/116 |
| 4,764,882 A | * 8/1988 | Braschel et al. ............... 702/42 |
| 5,487,265 A | 1/1996 | Rajamani et al. .......... 60/39.03 |
| 5,636,507 A | 6/1997 | Rajamani et al. .......... 60/39.03 |
| 5,650,623 A | 7/1997 | Rajamani et al. ........ 250/336.1 |
| 5,857,321 A | 1/1999 | Rajamani et al. .......... 60/39.27 |
| 5,896,736 A | 4/1999 | Rajamani ................. 60/39.03 |
| 6,195,607 B1 | 2/2001 | Rajamani et al. ............ 701/100 |
| 6,352,001 B1 | 3/2002 | Wickert et al. .......... 73/861.52 |
| 6,397,575 B2 | 6/2002 | Tomlinson et al. ........ 60/39.02 |

* cited by examiner

*Primary Examiner*—Justine R. Yu
*Assistant Examiner*—William H. Rodriguez
(74) *Attorney, Agent, or Firm*—Nixon & Vanderhye P.C.

(57) ABSTRACT

Critical stress in a gas turbine can be estimated using one or more readily measurable temperatures in the gas turbine. First and second critical temperatures can be estimated based on the at least one measurable temperature using heat conduction and convection equations. Subsequently, the critical stress can be estimated in real time according to a stress model prediction based on the difference between the critical temperatures, and possibly the rotational speed of the turbine, and some parameter, such as air pressure, that is indicative of air flow around the turbine component. Operation of the gas turbine can thus be controlled using the estimated critical temperatures.

16 Claims, 2 Drawing Sheets

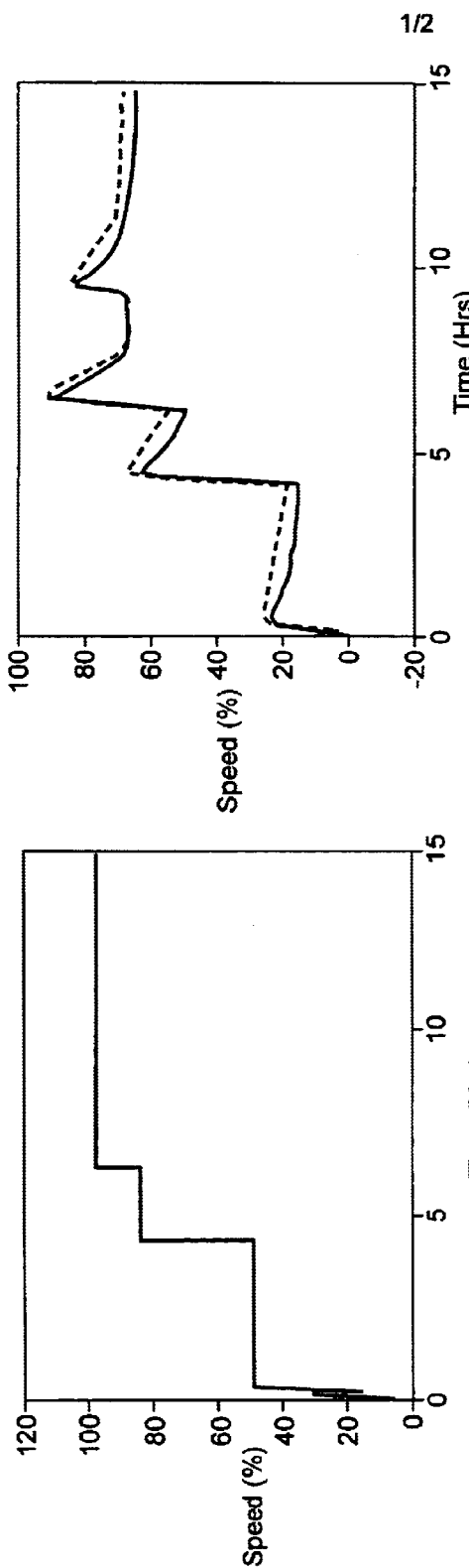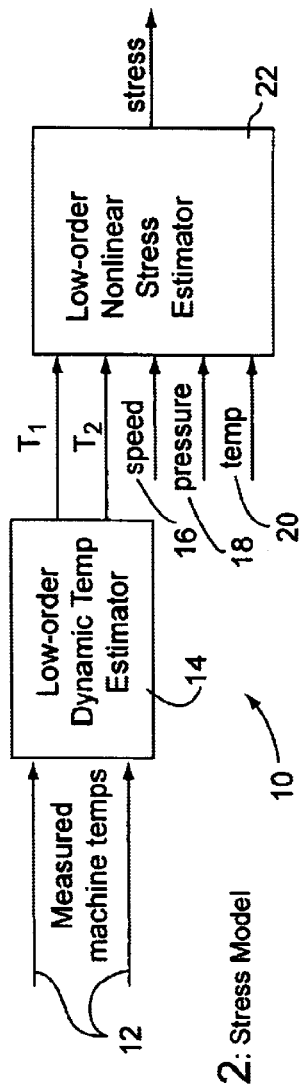
Figure 1: Startup schedule
Figure 3: Stress estimate
Figure 2: Stress Model

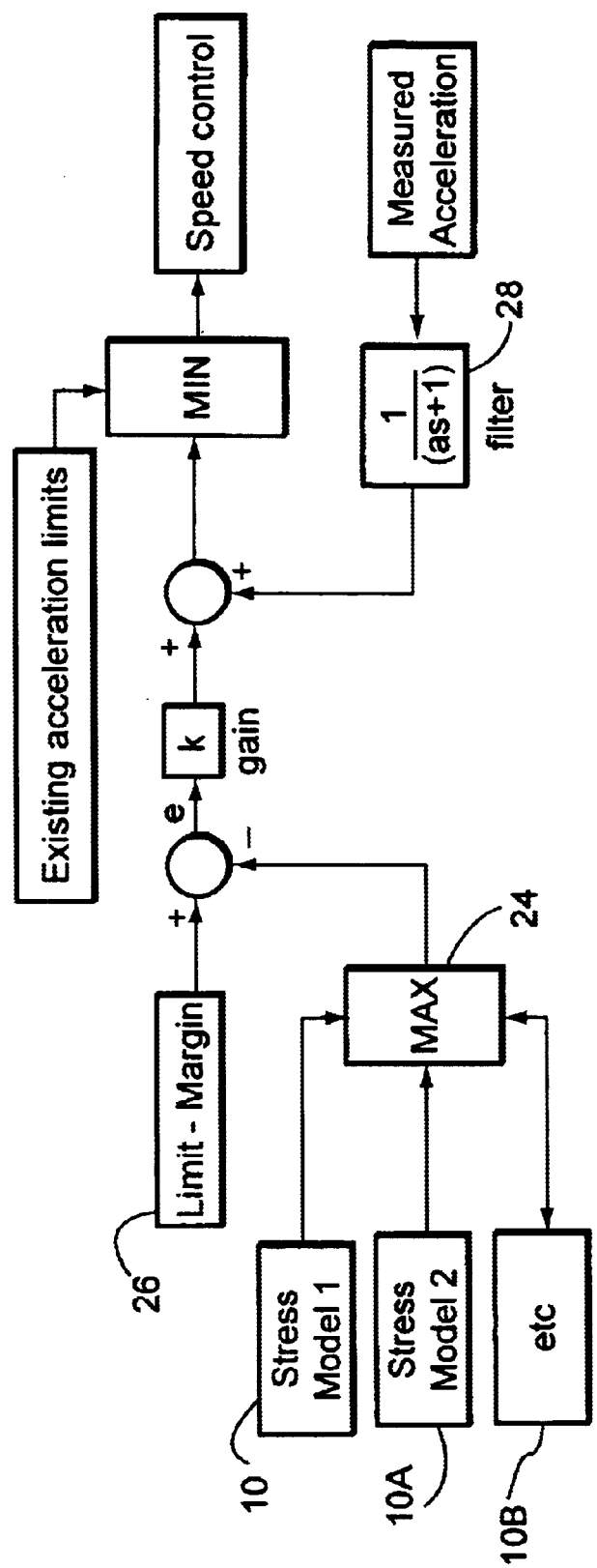
Figure 4: Control schematic

GAS TURBINE SYSTEM OPERATION BASED ON ESTIMATED STRESS

BACKGROUND OF THE INVENTION

The present invention relates to gas turbine operation and, more particularly, to a system and method for controlling gas turbine operation in a closed-loop manner based on estimated stress levels at key locations within the turbine.

Typical gas turbine operating control schedules are open-loop in nature, derived from extensive analysis of simulated thermal and mechanical stress levels in rotating components, and designed so that these nominal stresses are not exceeded during operation. As an example, a possible startup schedule for a gas turbine is shown in FIG. 1. The schedule includes turbine speed versus time and is used by the turbine speed controller as a reference. As the machine accelerates from startup, both mechanical and thermal stresses build up. Mechanical stresses are primarily due to aerodynamic reactions as well as rotational and centrifugal forces. Thermal stresses arise from differential thermal expansion within turbine metal parts. These thermal stresses result from sources of heat within the turbine that are not uniform, and hence different metal parts heat up at different rates. When two parts that are secured together expand at different rates, or even a single part that is massive enough that separate regions of the part expand at varying rates, mechanical deformation and severe stressing may result. Once these parts attain a substantially uniform temperature, however, the stress levels decrease.

Since peak stress levels cannot be allowed to exceed limits dictated by material integrity as well as ultimate component life, it is important that the machine is operated in such a manner that the stress levels are kept below these limits at all times. In the case of machine startup, this is achieved by "holding" the turbine at certain predetermined points in its startup cycle to allow the heat to "soak" in. FIG. 1 shows two such hold points at 50% and 85% of full speed. Hold points and hold times are typically derived from extensive off-line analysis that attempt to predict stress patterns using accurate, but very high order finite-element models.

To account for machine-to-machine variations as well as inaccuracies in the models, safety margins are built into the operating schedules. Better performance could be obtained from the machine in terms of quicker startups and the like if stresses could be measured or estimated on-line. Measuring such stress levels on rotating components, however, is prohibitively expensive.

BRIEF DESCRIPTION OF THE INVENTION

In an exemplary embodiment of the present invention, a method of operating a gas turbine includes the steps of (a) measuring at least one measurable temperature ($T_{MEAS}$) in the gas turbine; (b) using heat conduction and convention equations to estimate a first critical temperature ($T_1$) and a second critical temperature ($T_2$) based on $T_{MEAS}$; and (c) controlling the gas turbine based on $T_1$ and $T_2$.

In another exemplary embodiment of the invention, a method of estimating critical stress in a gas turbine includes the steps of (a) measuring at least one measurable temperature ($T_{MEAS}$) in the gas turbine; (b) using heat conduction and convection equations to estimate a first critical temperature ($T_1$) and a second critical temperature ($T_2$) based on $T_{MEAS}$; and (c) estimating the critical stress in real time according to a stress model prediction based on the difference between $T_1$ and $T_2$.

In still another exemplary embodiment of the invention, a system is provided for estimating critical stress in a gas turbine. The system includes a probe that measures at least one measurable temperature ($T_{MEAS}$) in the gas turbine. A processor receives input from the probe and uses heat conduction and convection equations to estimate first and second critical temperatures based on $T_{MEAS}$. The processor includes a memory storing a stress model prediction algorithm and estimates the critical stress in real time based on a difference between $T_1$ and $T_2$ using the stress model prediction algorithm.

BRIEF DESCRIPTION OF THE DRAWINGS

FIG. 1 is a graph showing a possible startup schedule for a gas turbine;

FIG. 2 is a schematic illustration of the system of the present invention;

FIG. 3 is a graph showing a real-time stress model prediction compared with a stress level predicted by finite-element models; and FIG. 4 is a control schematic of the system of the present invention.

DETAILED DESCRIPTION OF THE INVENTION

With the system of the present invention, a simple on-line model is used to estimate stress at one or more key locations in the gas turbine, and this stress estimate is used to control the machine. As a first exemplary application of the invention, the typical startup schedule is modified to provide an estimate of stress and hence operate the machine in a regulated fashion.

An important location in the compressor rotor where material stress limits operation has been identified using validated physics-based models. Extensive finite element analysis has also shown that this stress is strongly influenced by (1) the difference in temperature at two related points in the rotor, (2) the speed of the machine, and (3) the flow rate of air through the compressor, with the first factor being the most significant.

FIG. 2 is a schematic illustration of the system of the present invention. The temperatures $T_1$ and $T_2$ are internal operating temperatures that are used to estimate stress values within the turbine. These internal temperatures, however, cannot be measured. The invention incorporates a model 10 that uses simple heat conduction and convection equations. In one example, the two temperatures are estimated by solving the following set of ordinary differential equations (using standard off the shelf software):

$$\frac{dT_1}{dt} = -k_1(T_1 - T_{MEAS(1)}) - k_2(T_1 - T_2)$$

$$\frac{dT_2}{dt} = -k_3(T_2 - T_1) - k_4(T_2 - T_{MEAS(2)})$$

The measured temperatures TMEAS1 and TMEAS2 12 are shown as the first part of the model 10 in FIG. 2, and for example are air temperature measurements obtained around the component where the stress is being estimated. The model 10 is dynamic in nature, i.e. the model evolves over time. The temperatures 12 are input into a low-order dynamic temperature estimator 14, which is used to determine estimated values for T1 and T2. The constants k1–k4 are obtained from material properties such as coefficient of thermal conductivity, convective heat transfer coefficient, metal density, etc., as well as geometric properties such as length and thickness of the components. Subsequently, a non-linear static model or low-order non-linear stress estimator 22 inputs the determined temperatures T1 and T2, machine speed 16, pressure 18, and temperature 20 measurements in the compressor to estimate stress.

The following is an example of a static model that links the temperatures (T1 and T2), machine speed (S), and air pressure (P) to the peak stress (SEQ) at a particular critical location of the turbine:

$$SEQ = a_1(T_1-T_2) + a_2 S^n + a_3 P^m$$

where $a_1$, $a_2$, $a_3$, m and n are predetermined constants.

This model can be obtained from physics-based principals or from nonlinear regression analysis. In one example, where the latter was used to obtain the model, the values in the equation were: a1=0.4; a2=0.005; a3=0.1; n=2; and m=0.5. These numbers can vary depending on the location of the critical stress point.

FIG. 3 illustrates an example of how the real-time stress model prediction with the stress model 10 of FIG. 2 compares with the conventionally-determined stress level as predicted by the finite-element analysis model. The numerical values of stress have been normalized with respect to an arbitrary number and do not necessarily represent the stress level for the startup schedule in FIG. 1. The dotted line is the real-time stress model prediction (per the stress model 10 in FIG. 2), while the solid line represents the generally more accurate finite element analysis generated stress value. It can be seen from FIG. 3 that the real time stress model prediction almost identically matches the finite element analysis generated stress value.

Once the stress values have been determined using the low-order non-linear stress estimator 22 discussed above, operation of the turbine can be controlled in real time. Limits on stress level for safe operation of a gas turbine have been previously determined. These limits can be used to automatically control the startup (or other operating condition) of the machine without an open-loop schedule. One possible control schematic is illustrated in FIG. 4. The model 10 continuously estimates the stress at the key location. If there is more than one location where the stress level is critical, similar models 10A, 10B can be developed to estimate these stresses using the stress model 10 discussed above with reference to FIG. 2.

A maximum 24 of all these estimates is then compared against the limit, which is shown as being a constant in FIG. 4 but could be a function of other system parameters. A margin of safety is subtracted from this limit to accommodate modeling errors and other unknown variations. Reference number 26 designates the limit minus the margin of safety. While it is assumed in this detailed description that the limit is the same (whether constant or derived) for all locations, this does not necessarily have to be the case. Different limits can be incorporated for different locations. In this case, the differences between the stress levels and the individual limits (and corresponding safety margins) will be compared against each other to determine the maximum error.

In operation, if the estimated stress exceeds the modified limit, a negative error signal e is generated that is multiplied by a gain k and subtracted from the measured machine acceleration. This new value is used, along with existing limiting values, to reduce the rate of increase in speed (i.e., the acceleration) of the turbine. This reduction in acceleration leads to a reduction in the differential temperature and thus to a lower value for stress. This continues until the stress is lower than the modified limit, whereby the error signal e now becomes positive. In this event, the measured acceleration is then modified in the positive direction, thus raising the existing limit and allowing the speed to increase faster (i.e., at a higher acceleration). A filter 28 is included in the feedback path to filter the acceleration signal. The choice of the constant a in the filter 28 as well as the gain k is determined by using standard control engineering practice to maintain adequate performance and stability margin. These constants will be different for differently constructed machines.

In an alternative embodiment, other control methods can be implemented that function in essentially the same way but without the continuous control feature as described above. For example, a logical block could be added to the existing control algorithm that would receive the signal e (in FIG. 4) and hold the machine at the current speed whenever e is negative (to allow the stress to decrease) and allow it to accelerate along the normal startup schedule when e is positive.

With this system, real time stress levels can be estimated at key locations within the turbine, and a gas turbine can be controlled in a closed-loop manner based on the estimated stress levels.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A method of operating a gas turbine, the method comprising:
   (a) measuring at least one measurable temperature ($T_{MEAS}$) in the gas turbine;
   (b) using heat conduction and convection equations to estimate a first critical temperature (T1) and a second critical temperature (T2) of related axially spaced points based on $T_{MEAS}$; and
   (c) controlling the gas turbine based on T1 and T2.

2. A method according to claim 1, wherein step (a) is practiced using a temperature measurement device.

3. A method of operating a gas turbine, the method comprising:
   (a) measuring at least one measurable temperature ($T_{MEAS}$) in the gas turbine;
   (b) using heat conduction and convection equations to estimate a first critical temperature (T1) and a second critical temperature (T2) based on $T_{MEAS}$; and
   (c) controlling the gas turbine based on T1 and T2,
   wherein step (a) is practiced by measuring two measurable temperatures ($T_{MEAS(1)}$, $T_{MEAS(2)}$) in the turbine, and wherein step (b) is practiced by solving differential equations according to:

$$\frac{dT_1}{dt} = -k_1(T_1 - T_{MEAS(1)}) - k_2(T_1 - T_2)$$

$$\frac{dT_2}{dt} = -k_3(T_2 - T_1) - k_4(T_2 - T_{MEAS(2)}),$$

where $k_1$, $k_2$, $k_3$ and $k_4$ are predefined constants.

4. A method according to claim 1, wherein step (c) is practiced according to a difference between T1 and T2.

5. A method according to claim 4, wherein step (c) is further practiced according to a speed of the gas turbine and a pressure of air at a particular point in a compressor of the gas turbine.

6. A method according to claim 5, wherein step (c) comprises estimating a stress level in the gas turbine based on T1 and T2 and controlling the gas turbine based on the estimated stress level.

7. A method according to claim 6, wherein the stress level (SEQ) is determined according to:

$$SEQ = a_1(T_1 - T_2) + a_2 S^n + a_3 P^m$$

where S is the speed of the gas turbine, P is a pressure of air at a particular point in the gas turbine compressor, and $a_1$, $a_2$, $a_3$, m and n are predefined constants.

8. A method according to claim 6, further comprising setting a stress threshold level for safe operation of the gas turbine, wherein step (c) is practiced by limiting acceleration of the gas turbine when the estimated stress level exceeds the threshold level.

9. A method according to claim 8, wherein steps (a)–(c) are practiced in real time.

10. A method according to claim 8, wherein acceleration is limited until the estimated stress level is lower than the threshold level.

11. A method according to claim 1, wherein steps (a)–(c) are practiced in real time.

12. A method of estimating critical stress in a gas turbine, the method comprising:
(a) measuring at least one measurable temperature ($T_{MEAS}$) in the gas turbine;
(b) using heat conduction and convection equations to estimate a first critical temperature (T1) and a second critical temperature (T2) of related axially spaced points based on $T_{MEAS}$; and
(c) estimating the critical stress in real time according to a stress model prediction based on a difference between T1 and T2.

13. A method of estimating critical stress in a gas turbine, the method comprising:
(a) measuring at least one measurable temperature ($T_{MEAS}$) in the gas turbine;
(b) using heat conduction and convection equations to estimate a first critical temperature (T1) and a second critical temperature (T2) based on $T_{MEAS}$; and
(c) estimating the critical stress in real time according to a stress model prediction based on a difference between T1 and T2,
wherein step (a) is practiced by measuring two measurable temperatures ($T_{MEAS(1)}$, $T_{MEAS(2)}$) in the turbine, and wherein step (b) is practiced according to:

$$\frac{dT_1}{dt} = -k_1(T_1 - T_{MEAS(1)}) - k_2(T_1 - T_2)$$

$$\frac{dT_2}{dt} = -k_3(T_2 - T_1) - k_4(T_2 - T_{MEAS(2)}),$$

where $k_1$, $k_2$, $k_3$ and $k_4$ are predefined constants.

14. A method according to claim 12, wherein step (c) for estimating the critical stress (SEQ) is practiced according to a speed of the gas turbine and a pressure of air at a particular point in a compressor of the gas turbine.

15. A method according to claim 14, wherein step (c) is practiced according to:

$$SEQ = a_1(T_1 - T_2) + a_2 S^n + a_3 P^m$$

where S is the speed of the gas turbine, P is a pressure of air at a particular point in the gas turbine compressor, and $a_1$, $a_2$, $a_3$, m and n are predefined constants.

16. A system for estimating critical stress in a gas turbine, the system comprising:
a probe that measures at least one measurable temperature ($T_{MEAS}$) in the gas turbine; and
a processor receiving input from the probe, the processor using heat conduction and convection equations to estimate a first critical temperature (T1) and a second critical temperature (T2) of related axially spaced points based on $T_{MEAS}$, wherein the processor comprises a memory storing a stress model prediction algorithm, the processor estimating the critical stress in real time based on a difference between T1 and T2 using the stress model prediction algorithm.

* * * * *

UNITED STATES PATENT AND TRADEMARK OFFICE
CERTIFICATE OF CORRECTION

PATENT NO. : 6,694,742 B2
APPLICATION NO. : 10/179277
DATED : February 24, 2004
INVENTOR(S) : Rajamani et al.

It is certified that error appears in the above-identified patent and that said Letters Patent is hereby corrected as shown below:

In Column 1, immediately below the title, insert:

--The Government of the United States of America has rights in this invention pursuant to Contract No. DE-FC21-95MC31176 awarded by the U. S. Department of Energy.--

Signed and Sealed this

Twentieth Day of February, 2007

JON W. DUDAS
*Director of the United States Patent and Trademark Office*